US011679570B2

(12) United States Patent
Hirabayashi et al.

(10) Patent No.: US 11,679,570 B2
(45) Date of Patent: Jun. 20, 2023

(54) PREPREG LAMINATION APPARATUS, METHOD OF LAMINATING PREPREGS AND METHOD OF MOLDING COMPOSITE MATERIAL

(71) Applicant: SUBARU CORPORATION, Tokyo (JP)

(72) Inventors: Daisuke Hirabayashi, Tokyo (JP); Kazuyuki Aoki, Tokyo (JP); Kei Koiwai, Tokyo (JP); Tomoyoshi Kuniya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/388,387

(22) Filed: Jul. 29, 2021

(65) Prior Publication Data

US 2022/0072813 A1    Mar. 10, 2022

(30) Foreign Application Priority Data

Sep. 10, 2020  (JP) .............................. JP2020-152420

(51) Int. Cl.
*B29C 70/50* (2006.01)
*B29B 15/12* (2006.01)
(Continued)

(52) U.S. Cl.
CPC .......... *B29C 70/504* (2013.01); *B29B 15/122* (2013.01); *B29C 35/0277* (2013.01);
(Continued)

(58) Field of Classification Search
CPC .......... B29K 2105/0872; B29C 70/545; B29C 70/06; B29C 35/0277; B29C 70/504; B29B 15/122
See application file for complete search history.

(56) References Cited

U.S. PATENT DOCUMENTS 9,003,619 B2    4/2015 Kawabe
2014/0083620 A1    3/2014 Caffiau et al.
(Continued)

FOREIGN PATENT DOCUMENTS

EP    3 453 526 A1    3/2019
EP    3453526 A1 *    3/2019    ........... B29C 70/382
(Continued)

OTHER PUBLICATIONS

Extended European Search Report dated Jan. 25, 2022 for European Patent Application No. 21189842.4 (9 pages).

*Primary Examiner* — Vishal I Patel
(74) *Attorney, Agent, or Firm* — Smith, Gambrell & Russell, LLP

(57) ABSTRACT

According to one implementation, a prepreg lamination apparatus includes first and second rollers, a table, and a feed structure. The first roller sends out a first prepreg tape which is a part of material of an FRP. The second roller sends out a second prepreg tape which is another part of the material of the FRP. The table is for laminating the first and second prepreg tapes directly or indirectly. The feed structure is adapted to feed out the first and second prepreg tapes in a feeding direction by moving the first and second rollers relatively to the table while performing at least one of movement of the first roller relatively to the second roller, and rotation of at least one of the first and second rollers relatively to the table around an axis which is not parallel to each of rotation axes of the first and second rollers.

23 Claims, 6 Drawing Sheets

(51) Int. Cl.
*B29C 35/02* (2006.01)
*B29C 70/06* (2006.01)
*B29C 70/54* (2006.01)
*B29K 105/08* (2006.01)

(52) U.S. Cl.
CPC ............ *B29C 70/06* (2013.01); *B29C 70/545* (2013.01); *B29K 2105/0872* (2013.01)

(56) References Cited

U.S. PATENT DOCUMENTS

2019/0070800 A1   3/2019   Blom-Schieber et al.
2021/0206122 A1*  7/2021   Kawabe ................. B29C 70/34

FOREIGN PATENT DOCUMENTS

| JP | 2020-059145 A | 4/2020 | |
| WO | 2010/137525 A | 12/2010 | |
| WO | 2020/071466 A1 | 4/2020 | |
| WO | WO-2020071466 A1 * | 4/2020 | ............. B29C 70/06 |

* cited by examiner

PREPREG LAMINATION APPARATUS, METHOD OF LAMINATING PREPREGS AND METHOD OF MOLDING COMPOSITE MATERIAL

CROSS REFERENCES TO RELATED APPLICATIONS

This application is based upon and claims the benefit of priority from Japanese Patent Application No. 2020-152420, filed on Sep. 10, 2020; the entire contents of which are incorporated herein by reference.

FIELD

Implementations described herein relate generally to a prepreg lamination apparatus, a method of laminating prepregs and a method of molding a composite material.

BACKGROUND

Conventionally, an FRP (fiber reinforced plastic), such as a GFRP (glass fiber reinforced plastic) or a CFRP (carbon fiber reinforced plastic) is known as a material consisting of resin reinforced with fibers. The FRP, which is also called a composite material, is produced by curing resin with which fibers have been impregnated.

Typical methods of molding a composite material include an RTM (Resin Transfer Molding) method, and a method for producing the composite material by laminating and shaping prepregs, which are sheet like material consisting of fibers impregnated with uncured resin, and subsequently curing the shaped laminated body of the prepregs. The RTM method is a method for molding a composite material by which fiber sheets which have not been impregnated with resin are laminated and shaped, and subsequently, the laminated and shaped fibers are impregnated with resin and the resin is cured.

Therefore, it is necessary to prepare fiber sheets or prepreg sheets as material in order to mold a composite material. For that purpose, a technique, called "opening a fiber bundle", which spreads a reinforcing fiber bundle, such as a carbon fiber bundle or a glass fiber bundle, thinly and uniformly is known (for example, refer to International Publication WO 2010/137525 A).

Opening a fiber bundle is an operation for thinning the fiber bundle, obtained by bundling about 12,000 to 24,000 fibers each having the thickness of about 0.007 mm, while spreading the width of the fiber bundle continuously using rollers or the like. In recent years, a fiber tape obtained by opening a fiber bundle has been sold under the name of dry tape material.

As for molding a composite material, it is a problem to be solved that a composite material having a complicated shape, such as a plate member, curved in a direction approximately perpendicular to the board thickness direction at a large curvature, into a shape close to an annular sector, or a plate member whose width changes, can be molded.

For example, when a composite material whose shape is an annular sector is tried to be molded by laminating tape material with changing a traveling direction of the tape material, that is, by laminating the tape material with steering the traveling direction, the outer part of the annular sector is stretched due to the large tension while the inner part of the annular sector slacks, and thereby wrinkles are generated, since the length of the inner arc of the annular sector is different from the length of the outer arc of the annular sector although the width of prepreg tape material and dry tape material marketed as rolled material is constant. Accordingly, when the curvature of the annular sector is large, tape material may have to be cut to be laminated with accepting the deterioration in strength due to the cutting of the fibers, or may have to be laminated with altering a fiber orientation, desirable for opposing a load, to another one.

Similarly, also in case of molding a composite material whose width changes, tape material whose width is constant may have to be cut to be laminated with accepting the deterioration in strength due to the cutting of the fibers, or may have to be laminated with altering a fiber orientation, desirable for opposing a load, to another one.

Moreover, a composite material having a shape too complicated to secure the quality of the composite material even by cutting tape material or by altering a laminating direction of tape material cannot be produced.

Accordingly, an object of the present invention is to make it possible to easily mold a composite material having a complicated shape.

SUMMARY OF THE INVENTION

In general, according to one implementation, a prepreg lamination apparatus includes at least one first roller, at least one second roller, a table and a feed structure. The at least one first roller sends out a first prepreg tape which is a part of material of a fiber reinforced plastic. The at least one second roller sends out a second prepreg tape which is another part of the material of the fiber reinforced plastic. The table is for laminating the first prepreg tape and the second prepreg tape directly or indirectly. The feed structure is adapted to feed out the first prepreg tape and the second prepreg tape in a feeding direction by moving the at least one first roller and the at least one second roller relatively to the table while performing one or both of movement of the at least one first roller relatively to the at least one second roller, and rotation of one or both of the at least one first roller and the at least one second roller relatively to the table around an axis which is not parallel to each of a first rotation axis of the at least one first roller and a second rotation axis of the at least one second roller.

Further, according to one implementation, a method of laminating prepregs includes: producing a laminated body of the prepregs consisting of first prepregs including the first prepreg tape and second prepregs including the second prepreg tape, using the above-mentioned prepreg lamination apparatus.

Further, according to one implementation, a method of laminating prepregs includes: sending out a first prepreg tape by a first roller; sending out a second prepreg tape by a second roller; and directly or indirectly laminating the first prepreg tape and the second prepreg tape on a table. The first prepreg tape is a part of material of a fiber reinforced plastic. The second prepreg tape is another part of the material of the fiber reinforced plastic. The first prepreg tape and the second prepreg tape are sent out in a feeding direction by moving the first roller and the second roller relatively to the table while performing at least one of movement of the first roller relatively to the second roller, and rotation of at least one of the first roller and the second roller relatively to the table around an axis which is not parallel to each of a first rotation axis of the first roller and a second rotation axis of the second roller.

Further, according to one implementation, a method of molding a composite material includes: forming the fiber reinforced plastic by curing a laminated body of first prepregs including the first prepreg tape and second prepregs including the second prepreg tape. The laminated body has been produced using the above-mentioned prepreg lamination apparatus.

Further, according to one implementation, a method of molding a composite material includes: forming the fiber reinforced plastic by curing a laminated body of the prepregs consisting of first prepregs including the first prepreg tape and second prepregs including the second prepreg tape. The laminated body has been produced by the above-mentioned method.

DETAILED DESCRIPTION

A prepreg lamination apparatus, a method of laminating prepregs and a method of molding a composite material according to implementations of the present invention will be described with reference to the accompanying drawings.
(First Implementation)
(Structure and Function)

Figure 1:
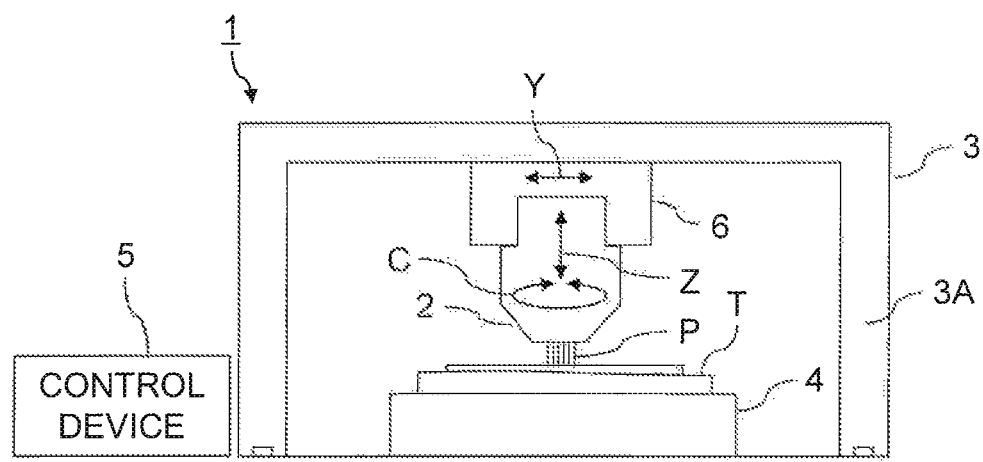
FIG. 1 is a front view showing an overall schematic structure of a prepreg lamination apparatus according to the first implementation of the present invention.
Figure 2:
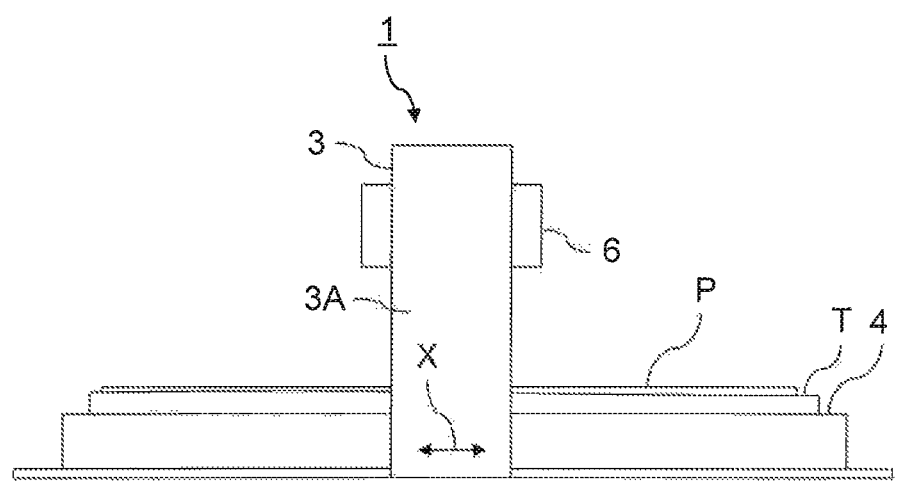
FIG. 2 is a side view of the prepreg lamination apparatus shown in FIG. 1.

FIG. 1 is a front view showing an overall schematic structure of a prepreg lamination apparatus 1 according to the first implementation of the present invention, and FIG. 2 is a side view of the prepreg lamination apparatus 1 shown in FIG. 1.

The prepreg lamination apparatus 1 produces a laminated body of prepregs P, which are material of a composite material consisting of an FRP, by laminating the prepregs P. The prepreg P is sheet like fibers impregnated with uncured thermoplastic resin or uncured thermosetting resin. The prepreg lamination apparatus 1 is an automatic lamination apparatus of the prepregs P, which produces a laminated body of the prepregs P using material consisting of rolled prepreg tapes P.

The prepreg lamination apparatus 1 can be composed of a laminating head 2, a gantry 3 suspending the laminating head 2, a table 4, and a control device 5. The laminating head 2 houses the prepreg tapes P inside, and feeds out the prepreg tapes P on the table 4 by discharging the prepreg tapes P. In particular, the laminating head 2 has a function to dispose the prepreg tapes P in parallel while feeding out the prepreg tapes P on the table 4. For that purpose, the laminating head 2 has roll stockers of the prepreg tapes P.

The table 4 is a pedestal for laminating the prepreg tapes P. Although the prepreg tapes P may be directly laminated on the table 4, it is practical to place a lamination jig T, such as a shaping mold, on the table 4 so that the prepreg tapes P may be laminated on the lamination jig T, from a viewpoint of shaping a laminated body of the prepregs P and cleaning. Therefore, the prepreg tapes P can be laminated on the table 4 directly or indirectly through the lamination jig T.

The gantry 3 includes a feed structure 6 which moves the laminating head 2 in a desired axis direction, besides supporting structures, such as supporting columns 3A, for supporting the laminating head 2. The feed structure 6 makes the laminating head 2 perform a feeding operation. That is, the feed structure 6 moves the laminating head 2 relatively to the table 4 so that the prepreg tapes P can be fed out toward the table 4 side while changing a lamination position. A feeding direction of the prepreg tapes P toward the table 4 side is opposite to a moving direction of the laminating head 2.

The feed structure 6 is configured to rotate the laminating head 2, in addition to typical linear movement of the laminating head 2. Therefore, the prepreg tapes P can be fed out linearly or along a curved line. In other words, a feeding direction of the prepreg tapes P can be changed. Note that, a component attached to the laminating head 2 may be rotated instead of rotating a casing itself of the laminating head 2.

In the example shown in FIG. 1 and FIG. 2, the feed structure 6 has been configured not only to move the laminating head 2 in parallel along three axis directions orthogonal to each other, including horizontal directions and the vertical direction consisting of X-axis, Y-axis and Z-axis, but to rotate the laminating head 2 along a C-axis direction whose rotation axis is the Z-axis in the vertical direction. As a matter of course, at least one tilt axis for inclining the laminating head 2 relative to the surface of the table 4 may be added. Moreover, the table 4 may be moved to the laminating head 2 by the feed structure 6 in addition to the movement of the laminating head 2, or instead of the movement of the laminating head 2.

The moving structure for linearly moving the laminating head 2 and/or the table 4 can be composed of at least one motor, such as an electric motor, a hydraulic motor or a pneumatic motor, circuitry, such as electric circuitry, hydraulic circuitry or pneumatic circuitry, for rotating the at least one motor, and at least one desired machine element, such as wheels, a rack-and-pinion which is one kind of gears, at least one ball screw, or at least one crawler, for converting rotational movement of the at least one motor into linear movement, for example. Alternatively, a moving structure may also be composed of at least one piston and hydraulic circuitry without using any motor.

Meanwhile, the rotating structure for rotating the laminating head 2 can be composed of at least one motor, such as an electric motor, a hydraulic motor or a pneumatic motor, and desired machine elements including a rotating shaft which rotates by power of the at least one motor, for example.

Therefore, the feed structure 6 serving as a feeder can be composed of the rotating structure, having at least a motor and a rotating shaft rotated by the motor, in addition to the moving structure, having at least one of wheels, gears, a piston, a ball screw and a crawler.

The control device 5 automatically controls the feed structure 6 and the laminating head 2. For example, NC (numerical control) of a spatial position and a rotational moving amount of the laminating head 2 relatively to the table 4 can be performed by controlling the feed structure 6. Moreover, the feeding of the prepreg tapes P from the laminating head 2 can be automatically started and ended as well as the prepreg tapes P can be automatically cut, by controlling the laminating head 2. Although the control device 5 may be built in or attached to the gantry 3, user interfaces, such as operation boards, and heavy components may be placed outside the gantry 3.

When NC control of the laminating head 2 is performed by the control device 5, the control device 5 can be composed of electronic circuitry, such as a computer, into which NC program has been read. Moreover, when the feed structure 6 is a hydraulic system or a pneumatic system, a part of the control device 5 can be composed by hydraulic circuitry or pneumatic circuitry.

Figure 3:
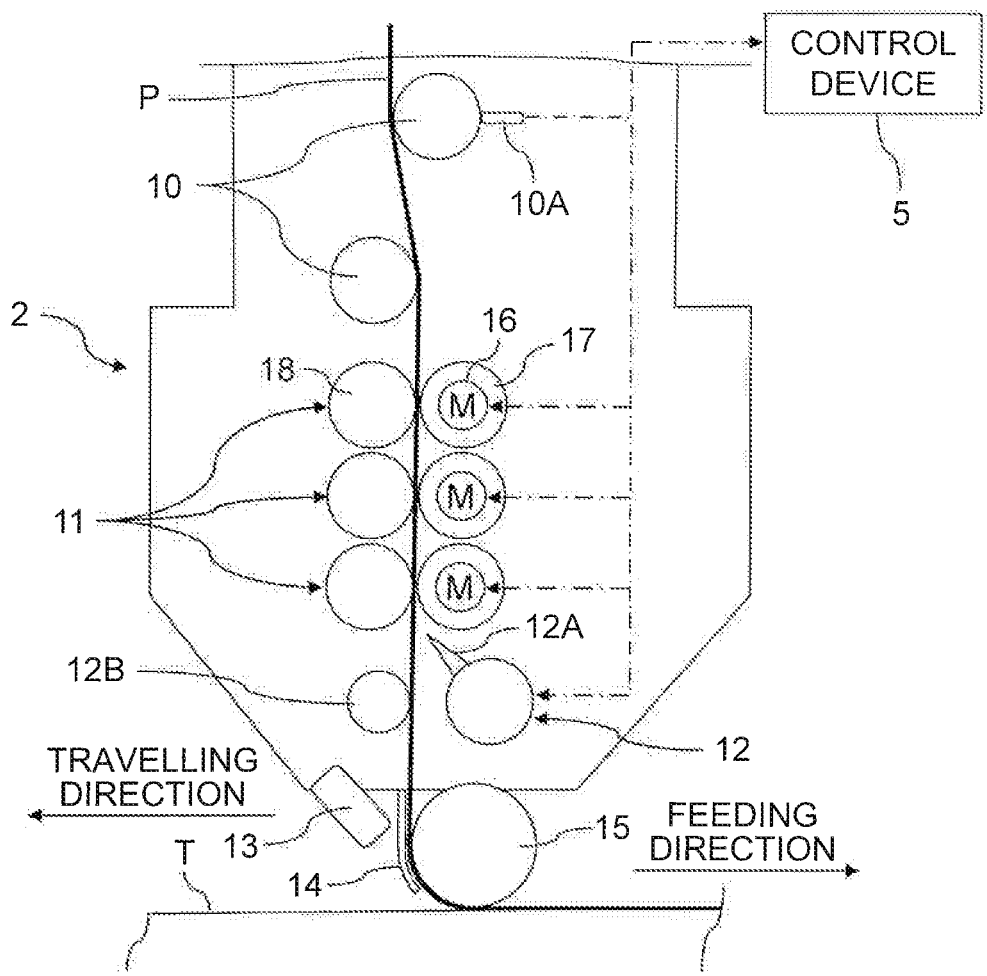
FIG. 3 is a side view showing an example of detailed structure inside and outside the laminating head shown in FIG. 1.

FIG. 3 is a side view showing an example of detailed structure inside and outside the laminating head 2 shown in FIG. 1.

As exemplified by FIG. 3, parts including rollers for feeding out the prepreg tapes P, supplied from rolls respectively, on the table 4 or the lamination jig T are housed in or attached to the laminating head 2. More specifically, at least one tension roller 10, feed rollers 11, a cutter 12, a heater 13, a guide 14 and at least one compaction roller 15 along a traveling direction of the prepreg tapes P can be housed in or attached to the laminating head 2.

The tension roller 10 is a columnar or cylindrical roller which applies tension on the prepreg tape P so that slack of the prepreg tape P can be prevented. When the traveling direction of the prepreg tape P is changed by contacting the tension roller 10 with the prepreg tape P, tension can be applied on the prepreg tape P.

Therefore, the single tension roller 10 may be common among the prepregs P, or the tension rollers 10 may be separately disposed among the respective prepregs P. Moreover, only the single tension roller 10 may be disposed to apply tension on the single prepreg tape P, or the tension rollers 10 may be disposed to apply tension on the single prepreg tape P. In the example shown in FIG. 3, two common tension rollers 10 have been disposed so as to apply tension on the prepreg tapes P. Moreover, at least one pressure sensor 10A may be disposed in order to measure and confirm tension of each prepreg tape P, as needed.

Figure 4:
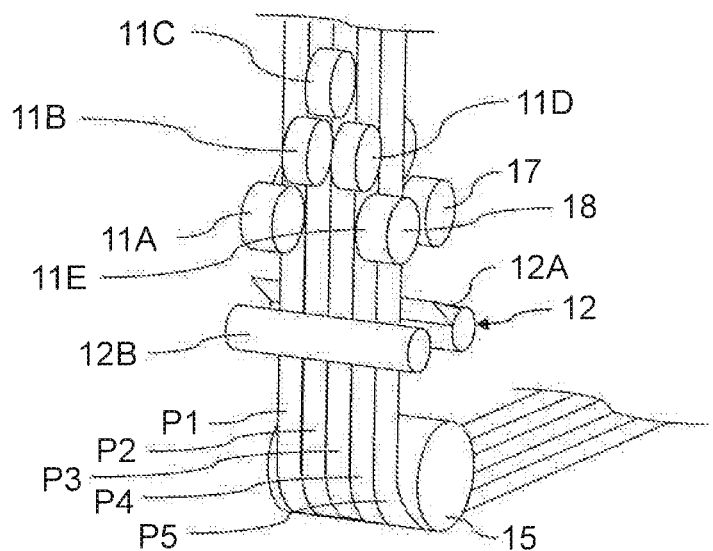
FIG. 4 is a perspective view of the feed rollers, the cutter and the compaction roller shown in FIG. 3.

FIG. 4 is a perspective view of the feed rollers 11, the cutter 12 and the compaction roller 15 shown in FIG. 3.

The feed rollers 11 feed out the prepreg tapes P in length directions of the prepreg tapes P respectively. When the laminating head 2 is rotationally moved by the feed structure 6 as mentioned above, the prepreg tapes P are fed out at feeding speeds different from each other. Therefore, the feeding speeds of the prepreg tapes P may become different from each other in the laminating head 2.

For that reason, the feed rollers 11 can be disposed for each prepreg tape P as exemplified by FIG. 3 and FIG. 4. That is, the feed rollers 11 which can be rotated at rotation speeds different from each other can be disposed in the laminating head 2.

In the example shown in FIG. 4, the laminating head 2 has the five sets of feed rollers 11 consisting of the first feed rollers 11A, the second feed rollers 11B, the third feed rollers 11C, the fourth feed rollers 11D and the fifth feed rollers 11E so that five tapes consisting of the first prepreg tape P1, the second prepreg tape P2, the third prepreg tape P3, the fourth prepreg tape P4 and the fifth prepreg tape P5 can be individually fed out respectively. Accordingly, the prepreg tapes P1, P2, P3, P4 and P5 can be fed out with the feed rollers 11A, 11B, 11C, 11D and 11E respectively.

In order to feed out the tip of each prepreg tape P, it is necessary to sandwich the tip of each prepreg tape P. Therefore, each set of the feed rollers 11 can be configured to sandwich the prepreg tape P between a columnar or cylindrical power roller 17, powered by a motor 16 to rotate, and a columnar or cylindrical unpowered support roller 18, as shown in FIG. 3 and FIG. 4, for example. As a matter of course, both of two rollers which sandwich the prepreg tape P may be rotated by power from the motor 16. In other words, the prepreg tape P may be sandwiched by the two power rollers 17.

Each motor 16 for driving the feed roller 11 can be controlled by the control device 5. Therefore, the feeding start and the feeding stop of each prepreg tape P can be controlled by controlling the rotation start and the rotation stop of the motor 16. Moreover, a rotation speed of each motor 16 may be variably controlled according to the moving speed of the laminating head 2.

In case of disposing the prepreg tapes P in parallel while feeding out the prepreg tapes P so that the thickness direction of the prepreg tapes P may become perpendicular to the surface of the table 4 as illustrated, it is reasonable to dispose the respective feed rollers 11 so that the rotating axes of the power rollers 17 and the support rollers 18 included in the feed rollers 11 may each become parallel to the surface of the table 4. Accordingly, the rotating axes of the power rollers 17 and the support rollers 18 included in the feed rollers 11 in the example shown in FIG. 3 and FIG. 4 have been each disposed so as to become parallel to the surface of the table 4.

Note that, the respective prepreg tapes P are fed out in a state where the prepreg tapes P are disposed in parallel to each other so that any gap may not be generated between the tapes. Moreover, the width of each feed roller 11 is made not less than that of the prepreg tape P. Accordingly, if three or more feed rollers 11 are coaxially disposed adjacently to each other, it becomes difficult to transfer torque from the motors 16 independently.

For that reason, in order to avoid interference between the motors 16 for rotating the power rollers 17 of the feed rollers 11 respectively, the power rollers 17 in the example shown in FIG. 3 and FIG. 4 have been disposed in parallel to each other so that the number of the power rollers 17 whose rotating axes are on the same straight line may become not more than two. Similarly, the support rollers 18 have been also disposed in parallel to each other so that the number of the support rollers 18 whose rotating axes are on the same straight line may be not more than two.

Thereby, torque can be transmitted to each set of the two power rollers 17 on the same straight line by the motors 16 disposed on both sides of the two power rollers 17 respectively. Note that, the output shaft of the motor 16 may be coupled to the rotation shaft of the power roller 17 not only coaxially but indirectly through gears or a power transmission belt. Therefore, some or all of the power rollers 17 may be rotated by the common motor 16.

Each power roller 17 may also be coupled to the rotation shaft, for transmitting the torque of the motor 16, through a one-way clutch. In that case, each power roller 17 can be rotated at a rotation speed not less than a rotation speed generated by the motor 16. Moreover, it also becomes possible to couple the adjacent power rollers 17 to a common rotation shaft so that the rotation axes may become on the same straight line.

The cutter 12 is a tool for cutting the prepreg tapes P fed out in parallel when the prepregs P have been laminated. The operation of the cutter 12 can be controlled by the control device 5. Although the cutter 12 may be prepared for every prepreg tape P, disposing the single cutter 12 common to the prepreg tapes P allows cutting the prepreg tapes P with aligning the end parts of the prepreg tapes P.

Although the cutter 12 in the example shown in FIG. 3 is a rotary type in which the cutter 12 is rotated in order to contact a blade 12A of the cutter 12 with the prepreg tapes P, the cutter 12 may be moved in parallel in order to contact the blade 12A of the cutter 12 with the prepreg tapes P. Moreover, the columnar or cylindrical roller 12B may be disposed for sandwiching the prepreg tapes P between the roller 12B and the blade 12A of the cutter 12.

The heater 13 is provided to adjust adhesive force of the prepregs P by heating the prepreg tapes P. The sufficient adhesive force of the prepregs P can reduce slippage of the laminated prepreg tapes P.

The guide 14 is a part for feeding out the prepreg tapes P toward the at least one columnar or cylindrical compaction roller 15. Therefore, the guide 14 can be composed of at least one plate curved according to the shape of the surface of the at least one compaction roller 15.

The compaction roller 15 is a columnar or cylindrical pressing member for pressing the prepreg tape P or the prepreg tapes P, fed out from the feed rollers 11, toward the table 4 side. That is, the compression stress in the thickness direction of the prepreg tapes P disposed in parallel can be applied on the prepreg tapes P from the at least compaction roller 15. Thereby, the adhesive prepreg tapes P can be made to adhere on the table 4, the lamination jig T or a laminated lower ply of the prepreg tapes P.

When the compaction roller 15 is made common among the prepreg tapes P as exemplified by FIG. 3 and FIG. 4, the prepreg tapes P can be pressed and adhesively fixed on the same straight line by the linear part of the surface of the compaction roller 15 with which the prepreg tapes P are contacted. Specifically, the first prepreg tape P1, the second prepreg tape P2, the third prepreg tape P3, the fourth prepreg tape P4 and the fifth prepreg tape P5 which have been fed out from the first feed rollers 11A, the second feed rollers 11B, the third feed rollers 11C, the fourth feed rollers 11D and the fifth feed rollers 11E respectively can be compressively-stressed in the thickness direction by the common compaction roller 15.

Conversely, the compaction roller 15 may be disposed separately for every prepreg tape P. In that case, the prepreg tapes P are subsequently pressed and fixed on different positions of the table 4, the lamination jig T or the lower ply of the prepreg tapes P.

Even when the compaction roller 15 is not powered, the compaction roller 15 can be rotated by friction force between the compaction roller 15 and each prepreg tape P having viscosity. Nevertheless, a motor for powering the compaction roller 15 may be provided in order to assist the rotation of the compaction roller 15

In addition, at least one non-rotating plate or block may be disposed as a pressing member for pressing the prepreg tapes P toward the table 4 side, instead of the at least one compaction roller 15 or in addition to the at least one compaction roller 15. The prepreg tapes P can also be laminated on a curved surface. Accordingly, when the pressing member is made of an elastic body, such as rubber, it becomes possible to press each prepreg tape P to a curved surface.

As described above, when the prepreg tapes P are fed out by the feed rollers 11 and are laminated in parallel on the table 4 directly or indirectly through the lamination jig T without gaps or with negligible gaps, it becomes possible to laminate the prepregs P into even a curved shape, such as an annular sector, without generating excess tension and wrinkles. Consequently, a laminated body of the prepregs P can be produced with high quality.

Figure 5:
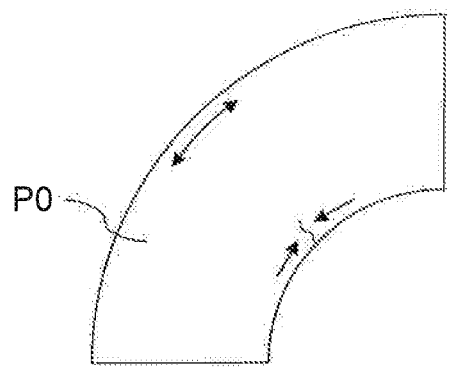
FIG. 5 is a top view showing an example of conventional prepreg tapes whose width is constant, laminated in an annular sector.
Figure 6:
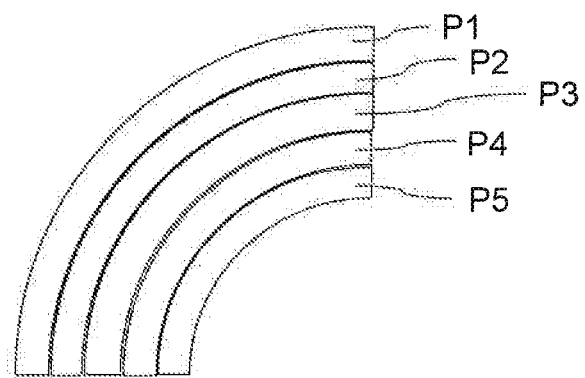
FIG. 6 is a top view showing an example of the prepreg tapes fed out from the feed rollers shown in FIG. 4 and laminated in an annular sector.

FIG. 5 is a top view showing an example of conventional prepreg tapes P0 whose width is constant, laminated in an annular sector. FIG. 6 is a top view showing an example of the prepreg tapes P fed out from the feed rollers 11 shown in FIG. 4 and laminated in an annular sector.

When the width of one prepreg tape P0 is determined in conformity to the width of a composite material, and the prepreg tape P0 is laminated into an annular sector with changing a feeding direction of the prepreg tape P0 under the conventional method, as shown in FIG. 5, excess tensile stress and wrinkles, undesirable for strength of a cured composite material, are generated in the prepreg tape P0. This is because the length of an inner arc of the annular sector is relatively short while the length of an outer arc of the annular sector is relatively long. Accordingly, in many cases of laminating the prepreg tape P0 while changing a feeding direction of the prepreg tape P0 as well as a case of an annular sector, the same problem arises.

On the other hand, the respective widths of the prepreg tapes P can be determined so that the widths of the prepreg tapes P laid and arrayed with no gaps or negligible gaps as shown in FIG. 6 may become the width of an uncured composite material. In this case, neither excess tensile stress nor wrinkles, undesirable for strength of a cured composite material, are generated in the prepreg tapes P even when the prepreg tapes P are laminated into an annular sector with changing a feeding direction of the prepreg tapes P by rotating the laminating head 2 relatively to the table 4.

This is because the prepreg tapes P can be fed out by the lengths according to the lengths of arcs respectively even when the length of an inner arc of an annular sector is different from the length of an outer arc of the annular sector. That is, adhering each prepreg tape P on the table 4, the lamination jig T or the prepreg P in the lower ply to fix the position of the prepreg tape P, with the at least one compaction roller 15, by taking advantage of the adherence property of the prepreg P, makes it possible to feed out each prepreg tape P at a feeding speed higher than the feeding speed of the feed rollers 11.

Accordingly, lamination of the prepregs P with steering can be performed along a curved line by changing a feeding direction of the laminating head 2 so that a laminated body of the prepregs P may become not only an annular sector but also another curved plate. In other words, each prepreg tape P can be fed out by the necessary length even when the laminating head 2 is moved along a curved line since the prepreg tapes P are subsequently fixed to the table 4, the lamination jig T or the prepregs P in the lower ply due to the adhesiveness of the prepreg P.

When the respective feeding lengths per unit time of the prepreg tapes P, i.e., the respective feeding speeds of the prepreg tapes P are different from each other, the rotation speeds of the feed rollers 11 are changed by adhesive force of the prepreg tapes P or the prepreg tapes P are fed out while slipping relative to the feed rollers 11. Therefore, it is appropriate to determine the rotation speeds of the power rollers 17, which feed the prepreg tapes P, according to the minimum feeding speeds of the prepreg tapes P respectively, from a viewpoint of keeping the tension of each prepreg tape P.

Alternatively, after the tips of the prepreg tapes P have adhered to the table 4, the lamination jig T or the prepregs P in the lower ply, the rotation speeds of the motors 16 for rotating the power rollers 17 may be decreased, or the rotations of the motors 16 may be stopped. When the prepreg tapes P are fed out after the rotations of the motors 16 have been stopped, the prepreg tapes P are fed out by the adhesive force of the prepregs P and the movement of the laminating head 2.

Although the adhesive force of the prepregs P can be adjusted by heating the prepregs P by the heater 13 as mentioned above, the adhesive force may not be fully obtained even by heating the prepregs P. For that reason, the respective rotation speeds of the motors 16 for rotating the power rollers 17 may be variably controlled. As a concrete example, the control device 5 can perform feedback control of the rotation speeds of the motors 16 and the power rollers 17 with measuring the tension of the prepreg tapes P by the pressure sensor 10A or the pressure sensors 10A so that the tension of the prepreg tapes P may become constant.

Alternatively, the control device 5 may perform NC control of the rotation speeds of the motors 16 and the power rollers 17 at every lamination positions of the prepreg tapes P since all the lamination positions of the prepreg tapes P are known before laminating the prepreg tapes P. That is, in addition to NC control of the spatial position and the rotation amount of the laminating head 2, NC control of the rotation speeds of the motors 16 and the power rollers 17 can be also performed by the control device 5 into which NC program has been read.

The narrower the width of each prepreg tape P fed out from the laminating head 2 is, the less winkles and excess tension are generated in each prepreg tape P even when the laminating head 2 is rotated with the large curvature. In addition, it becomes possible to produce a composite material whose width is narrow. Therefore, it is desirable to narrow the width of each prepreg tape P from a viewpoint of improving the quality of a composite material and allowing producing a composite material having a complicated shape. Examples of the standardized prepreg tape P having relatively narrow width include the prepreg tape P whose width is 6.35 mm (¼ inch).

Conversely, the narrower the width of each prepreg tape P is, the more the moving amount of the laminating head 2 required to cover the inside of a lamination area increases as long as the number of the prepreg tapes P is constant. Moreover, the narrower the width of each prepreg tape P is, the more exchange frequency of each roll stocker increases as long as the winding number of the prepreg tape P on each roll stocker is constant. Therefore, as the width of each prepreg tape P narrows, manufacturing time and manufacturing cost of a composite material increase.

Accordingly, it is desirable to select and use the prepreg tape P having the appropriate width. Specifically, it is important to determine the width of each prepreg tape P depending on at least one of the maximum curvature in a curved portion of a composite material to be molded and the minimum width in a plate-like portion of the composite material to be molded.

For example, it is desirable to determine the width of each prepreg tape P so that the widths of the prepreg tapes P disposed in parallel may become not more than the minimum width in the plate-like portion of a composite material, from a viewpoint of avoiding cutting an unnecessary portion of the laminated prepreg tapes P.

In addition, it is appropriate to determine the width of each prepreg tape P so that neither wrinkles nor excess tension may be generated in each prepreg tape P even when the prepreg tapes P are disposed in parallel with curving the prepreg tapes P in order to produce the curved portion having the maximum curvature of a composite material. For that purpose, what is necessary is to determine the width of each prepreg tape P depending on the radius of rotation of the laminating head 2 so that when the prepreg tapes P are laminated in parallel directly or indirectly on the table 4 by feeding out the prepreg tapes P with rotating the laminating head 2, a difference or ratio in length between the tapes located on the sides close to and away from the axis of rotary movement of the laminating head 2 may be not more than a predetermined length or value.

Note that, although an example in which the laminating head 2 is not inclined relatively to the table 4 is illustrated, the same applies to a case in which the laminating head 2 is inclined relatively to the table 4. Specifically, when the laminating head 2 is inclined relatively to the table 4, what is necessary is to rotate the laminating head 2 around the rotation axis of the inclined laminating head 2.

As mentioned above, when the laminating head 2 is not inclined relatively to the table 4, it is reasonable to make the respective rotation axes of the power rollers 17 and the support rollers 18 included in the feed rollers 11 parallel to the surface of the table 4.

In this case, when the laminating head 2 is rotated relatively to the table 4 in the C-axis direction around the Z-axis perpendicular to the surface of the table 4, the feeding direction of the prepreg tapes P can be changed with a desired curvature. Specifically, when the laminating head 2 is rotated according to a traveling direction of the laminating head 2 so that the traveling direction of the laminating head 2 may be an opposite direction to the feeding direction of the prepreg tapes P, the feeding direction of the prepreg tapes P can be directed to the opposite direction to the traveling direction of the laminating head 2.

Meanwhile, when the laminating head 2 can be inclined relatively to the table 4, the feeding direction of the prepreg tapes P can be changed by rotating the laminating head 2 relatively to the table 4 around an axis, perpendicular to both of the feeding direction of the prepreg tapes P and the respective rotation axes of the power rollers 17 and the support rollers 18 included in the feed rollers 11, as the center.

Therefore, when the feeding direction of the prepreg tapes P is changed, the power rollers 17 and the support rollers 18 included in the feed rollers 11 are moved relatively to the table 4 in the feeding direction of the prepreg tapes P with rotation relative to the table 4 around an axis, which is not parallel to the respective rotation axes, as the center.

When all the prepreg tapes P have been laminated by the prepreg lamination apparatus 1, a laminated body of the prepregs P is produced. Then, a composite material can be molded by curing the produced laminated body of the prepregs P. When thermosetting resin is included in the prepregs P, the composite material can be thermally cured by heating the resin with an oven or an autoclave molding apparatus. Meanwhile, when thermoplastic resin is included in the prepregs P, the composite material can be cured by cooling the resin.

As described above, the prepreg lamination apparatus 1, the method of laminating prepregs and the method of molding a composite material allow the prepreg tapes P, each having a narrow width, to be laminated while disposing the prepreg tapes P in parallel.

(Effects)

Therefore, according to the prepreg lamination apparatus 1, the method of laminating prepregs and the method of molding a composite material, wrinkles and stretch conventionally generated in the prepreg tape P can be prevented even when the laminating head 2 is moved along a curved line whose curvature is large. In other words, it becomes possible to laminate the prepreg tapes P with steering, of which change rate in the feeding direction of the prepreg tapes P is large. As a result, a composite material with higher quality than a conventional one or a composite material having more complicated shape than a conventional one can be produced.

(Second Implementation)

Figure 7:
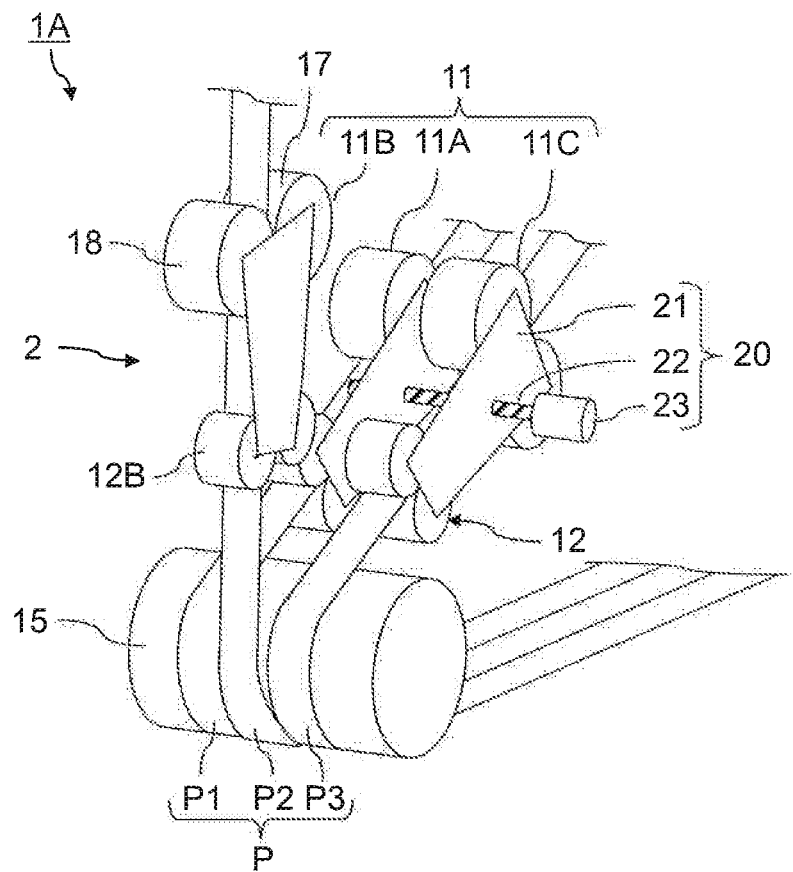
FIG. 7 is a perspective view showing structure of rollers included in a laminating head of a prepreg lamination apparatus according to the second implementation of the present invention.

FIG. 7 is a perspective view showing structure of rollers included in a laminating head 2 of a prepreg lamination apparatus 1A according to the second implementation of the present invention.

The prepreg lamination apparatus 1A in the second implementation shown in FIG. 7 is different from the prepreg lamination apparatus 1 in the first implementation in a point that an overlap width adjustment device 20 which adjusts overlap widths between the prepreg tapes P is included inside the laminating head 2, as a supplementary device of the feed structure 6 which feeds out the prepreg tapes P. Other structures and functions of the prepreg lamination apparatus 1A in the second implementation do not substantially differ from those of the prepreg lamination apparatus 1 in the first implementation. Therefore, only main rollers are illustrated, and the same signs are attached to the same elements and corresponding elements while explanation thereof is omitted.

The laminating head 2 of the prepreg lamination apparatus 1A in the second implementation has the overlap width adjustment device 20 in addition to the at least one tension roller 10 for securing the tension of the prepreg tapes P, the feed rollers 11 for feeding the prepreg tapes P separately, and the at least one compaction roller 15 for pressing the prepreg tapes P on the table 4 side.

The overlap width adjustment device 20 adjusts overlap widths between the prepreg tapes P. In order to overlap the prepreg tapes P with each other, it is necessary to guide the two adjacent prepreg tapes P to positions different from each other in the thickness direction of each prepreg tape P before overlapping the two adjacent prepreg tapes P with each other. Accordingly, the prepreg tapes P in the example shown in FIG. 7 have been alternately disposed at positions different from each other in the thickness direction of each prepreg tape P while the prepreg tapes P are overlapped with each other by the compaction roller 15.

Accordingly, it is reasonable to dispose the feed rollers 1*l* so that the respective rotating axes of the power rollers 17 and the support rollers 18 included in the feed rollers 11 may become parallel to each other, and to dispose the two sets of the feed rollers 11 adjacent in the rotating axis direction so that the respective rotating axes of the power rollers 17 and the support rollers 18 included in the two sets of the feed rollers 11 adjacent in the rotating axis direction may not be on the same straight line.

As a concrete example, when the three prepreg tapes P1, P2 and P3 are fed out by the three sets of the feed rollers 11A, 11B and 11C as exemplified by FIG. 7, the three sets of the feed rollers 11A, 11B and 11C are disposed so that the rotating axes of the power roller 17 and the support roller 18 included in the central feed rollers 11B may not be on the same straight lines as the rotating axes of the power rollers 17 and the support rollers 18 included in the two sets of the feed rollers 11A and 11C on both sides, respectively.

Whether the rotating axes of the power rollers 17 and the support rollers 18 included in the two sets of the feed rollers 11A and 11C on both sides are on the same straight lines respectively or not, the two prepreg tapes P1 and P3 respectively fed out from the two sets of the feed rollers 11A and 11C on both sides can be overlapped with the prepreg tape P2 fed out from the central feed rollers 11B. When positions of the two sets of the feed rollers 11A and 11C on both sides are determined so that the rotating axes of the power rollers 17 and the support rollers 18 included in the two sets of the feed rollers 11A and 11C on both sides may be on the same straight lines respectively, as exemplified by FIG. 7, design and production become easy.

Therefore, the single power roller 17 or the power rollers 17, each disposed in an odd number in the rotating axis direction, and the single power roller 17 or the power rollers 17, each disposed in an even number in the rotating axis direction, can be disposed alternately so that each rotating axis in an odd number and each rotating axis in an even number may be not on the same straight line. That is, it is reasonable to dispose each power roller 17 odd numbered in the rotating axis direction and each power roller 17 even numbered in the rotating axis direction alternately and adjacently to each other in the rotating axis direction.

Meanwhile, the cutters 12 are disposed at positions at which the cutters 12 can cut the prepreg tapes P short of the at least one compaction roller 15 respectively. When the prepreg tapes P are overlapped with each other by the compaction roller 15, the cutting positions of the prepreg tapes P are not on the same straight line. Therefore, the cutter 12 is also disposed for each prepreg tape P, similarly to the feed rollers 11.

Note that, a roller for overlapping the prepreg tapes P with each other may be disposed before the at least one compaction roller 15. In that case, the common cutter 12 may be used for cutting the overlapped prepreg tapes P.

In order to change each overlap width between the two adjacent prepreg tapes P, it is necessary to move at least one of the two prepreg tapes P in the width direction of the prepreg tapes P. Therefore, it is necessary to move one of the two power rollers 17, adjacent in the rotating axis direction, relatively to the other, in parallel in a direction parallel to the rotating axis. That is, adjusting each overlap width between the two adjacent power rollers 17 in the rotating axis direction allows adjusting each overlap width between the two adjacent prepreg tapes P.

For that reason, the overlap width adjustment device 20 is configured to automatically adjust each overlap width between the power rollers 17 in the rotating axis direction.

For example, when three sets of the feed rollers 11A, 11B and 11C are disposed as shown in FIG. 7, the overlap width in the rotating axis direction between the power roller 17 included in the central feed rollers 11B and the power roller 17 included in each of the two sets of the feed rollers 11A and 11C adjacent to the central feed rollers 11B can be automatically adjusted by the overlap width adjustment device 20.

Figure 8:
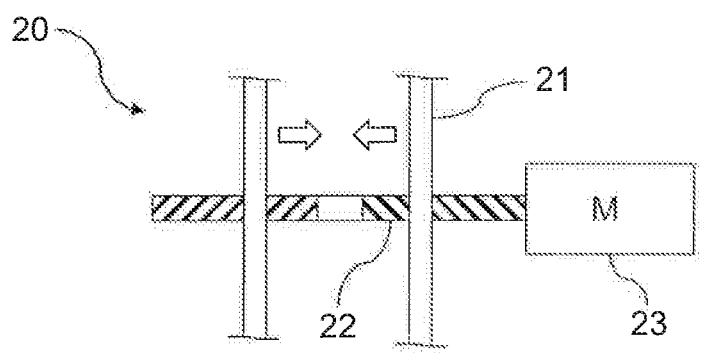
FIG. 8 is an arrow view of the overlap width adjustment device shown in FIG. 7 as viewed from a thickness direction of the prepreg tapes respectively fed out from the two feed rollers on both sides.

FIG. 8 is an arrow view of the overlap width adjustment device 20 shown in FIG. 7 as viewed from a thickness direction of the prepreg tapes P1 and P3 respectively fed out from the two feed rollers 11A and 11C on both sides.

As shown in FIG. 7 and FIG. 8, the overlap width adjustment device 20 can be composed of two plate-like frames 21, a ball screw 22, and a motor 23, for example. The frames 21 are members for coupling the cutters 12 to the power rollers 17 and the support rollers 18 of the feed rollers 11A and the feed rollers 11C disposed along the prepreg tape P1 and the prepreg tape P3 on both sides respectively. The ball screw 22 changes the interval between the feed rollers 11A and the feed rollers 11C disposed along the prepreg tape P1 and the prepreg tape P3 on both sides respectively. The ball screw 22 is rotated by the motor 23.

The power roller 17 and the support roller 18 included in the feed rollers 11 disposed along the same prepreg tape P1 or P3 are coupled to the cutter 12 by the frame 21. When another roller or a part is disposed along each of the prepreg tapes P1 and P3 on both sides, the roller or the part can also be coupled and integrated to the frame 21 along each prepreg tape P1 or P3.

As a concrete example, when the moving distances of the power rollers 17 and the prepreg tapes P1 and P3 are long, a part or all of the tension rollers 10 can be also disposed separately for each of the prepreg tapes P1 and P3. In that case, not only the tension roller 10 or the tension rollers 10, disposed separately for each of the prepreg tapes P1 and P3, but also the roll stocker can be coupled and integrated to the frame 21 along each prepreg tape P1 or P3.

Conversely, when the moving distances of the power rollers 17 and the two prepreg tapes P1 and P3 are short, and thereby the prepreg tapes P1 and P3 can be fed out by the power rollers 17 respectively even with sliding the prepreg tapes P1 and P3 relative to the tension roller 10 or the tension rollers 10 in the width direction, the tension roller 10 or the tension rollers 10 may be common to the prepreg tapes P1 and P3. In that case, the tension roller 10 or the tension rollers 10 are not coupled to the frame 21.

Note that, the traveling direction of the central prepreg tape P2 differs from the traveling direction of the prepreg tapes P1 and P3 on both sides until the central prepreg tape P2 is overlapped with the prepreg tapes P1 and P3 on both sides, as exemplified by FIG. 7. Therefore, at least a part of the tension rollers 10 cannot be shared and are separate between the central prepreg tape P2 and the prepreg tapes P1 and P3 on both sides.

When parts, including the feed rollers 11A or 11C, and the cutter 12, disposed along each of the prepreg tapes P1 and P3 on both sides are integrated by the frame 21 for each prepreg tape P1 or P3, the positions of the feed rollers 11A and 11C, and the prepreg tapes P1 and P3, in the rotating axis direction of the power rollers 17, can be changed by changing the positions of the frames 21.

The two plate-like frames 21 are coupled to each other, with an interval in the board thickness direction of the frames 21, by the ball screw 22 whose length direction is the rotating axis direction of the power rollers 17. Therefore, the feed rollers 11A and the feed rollers 11C, including the power rollers 17 and the support rollers 18 for feeding out the prepreg tape P1 and the prepreg tape P3 on both sides, are coupled to each other, by the ball screw 22, indirectly through the frames 21, respectively.

The two frames 21 each has a female screw, which is fastened to one of male screws formed on the ball screw 22. The female screw of one frame 21 is a right screw while the female screw of the other frame 21 is a left screw. Therefore, the male screw of the ball screw 22 for fastening the female screw in one frame 21 is also a right screw while the male screw of the ball screw 22 for fastening the female screw in the other frame 21 is also a left screw.

Accordingly, when the ball screw 22 is rotated, the interval between the two frames 21 can be widened by making the frames 21 away from each other, and conversely narrowed by making the frames 21 close to each other, according to a rotational direction of the ball screw 22. That is, the interval of the two frames 21 can be variably adjusted by the rotation of the ball screw 22. As a result, the distance between the feed rollers 11A and the feed rollers 11C, coupled to the two frames 21 respectively, can be adjusted by the ball screw 22.

The ball screw 22 is coupled to an output shaft of the motor 23, of which rotational direction and rotational speed can be controlled by the control device 5, directly or indirectly through gears or a power transmission belt. Therefore, the distance between the feed rollers 11A and the feed rollers 11C on both sides can be automatically adjusted by automatic control of the motor 23 by the control device 5.

When the distance between the feed rollers 11A and the feed rollers 11C on both sides is changed, the distance, in the rotating axis direction of the power rollers 17 and the support rollers 18, between the central feed rollers 11B and each of the feed rollers 11A and the feed rollers 11C on both sides is also changed. Therefore, the overlap width between the central prepreg tape P2 and each of the prepreg tape P1 and the prepreg tape P3 on both sides can be changed.

Accordingly, the rotation ranges of the ball screw 22 and the motor 23 can be determined so that the overlap width between the central prepreg tape P2 and each of the prepreg tape P1 and the prepreg tape P3 on both sides may become zero when the distance between the feed rollers 11A and the feed rollers 11C on both sides becomes the maximum while the overlap width between the central prepreg tape P2 and each of the prepreg tape P1 and the prepreg tape P3 on both sides may become the maximum when the distance between the feed rollers 11A and the feed rollers 11C on both sides becomes the minimum.

Thereby, the overlap width between the central prepreg tape P2 and each of the prepreg tape P1 and the prepreg tape P3 on both sides can be automatically adjusted within a range from zero to the maximum value by the automatic control of the motor 23 by the control device 5.

Note that, when the power rollers 17, the support rollers 18 and the cutters 12 on both side are attached to the frames 21 with shifting the respective rotating axes from those in the center so that each of the rotating axes on both side and that in the center may not be on the same straight line, interference between the sets of the power rollers 17, the support rollers 18 and the cutters 12 on both sides can be avoided. Accordingly, the interval between the two plate-like frames 21 can be narrowed down to the width of the prepreg tape P1 or P3. Therefore, the maximum value of the overlap width between the central prepreg tape P2 and each of the prepreg tape P1 and the prepreg tape P3 on both sides can be made to the width of the central prepreg tape P2, i.e., the maximum value of the overlap ratio can be made to 100%.

As described above, when the power rollers 17 for feeding the prepreg tapes P which are not adjacent to each other are coupled to each other by the ball screw 22 so that the interval, in the rotating axis direction, between the power rollers 17 can be adjusted by rotation of the ball screw 22, it becomes possible to adjust the overlap width between the adjacent prepreg tapes P. Nevertheless, when the interval between the power rollers 17 is adjusted by the ball screw 22 on which a right screw and a left screw have been formed, as exemplified by FIG. 7 and FIG. 8, the interval between only the two power rollers 17 can be adjusted.

Accordingly, when the number of the prepreg tapes P is not less than four, the overlap width adjustment device 20 can be composed of the ball screws 22 so that the number of the power rollers 17 whose positions are changed by the single ball screw 22 may be not more than two. In other words, when the overlap width adjustment device 20 is composed of at least one ball screw 22 on which a right screw and a left screw have been formed, disposing the power rollers 17 except for the single power roller 17, which does not move by the ball screw 22, so that the number of coaxially disposed power rollers 17 may be not more than two makes it possible to move each power roller 17 in the rotating axis direction relatively to the single power roller 17 which does not move.

Figure 9:
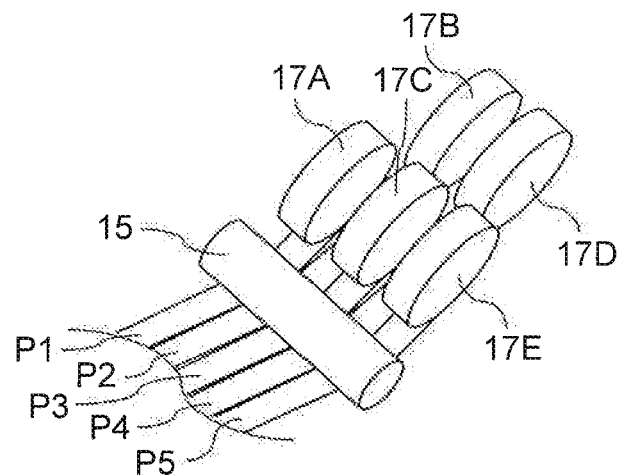
FIG. 9 is a perspective view showing an example of arrangement of the five power rollers inside the laminating head of the prepreg lamination apparatus.
Figure 10:
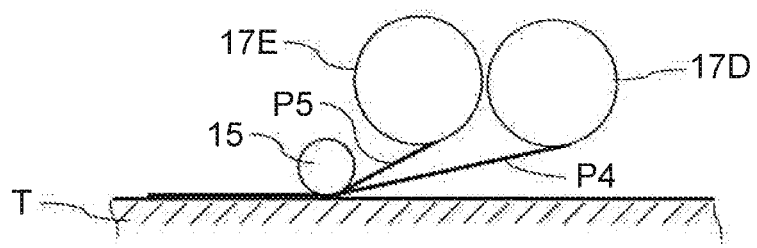
FIG. 10 is a side view of the power rollers shown in FIG. 9.
Figure 11:
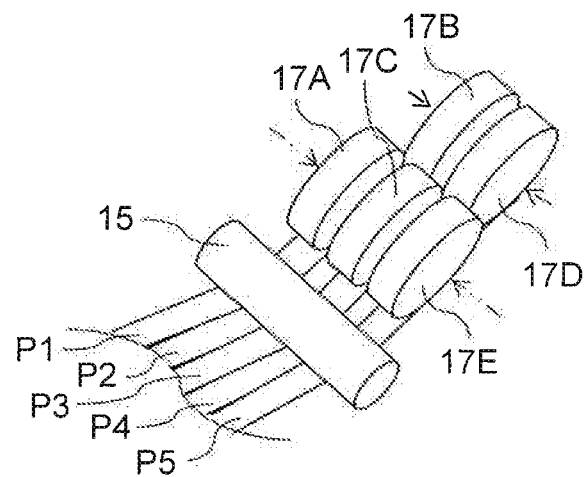
FIG. 11 is a perspective view showing an example of the power rollers shown in FIG. 9 whose intervals have been narrowed.

FIG. 9 is a perspective view showing an example of arrangement of the five power rollers 17A, 17B, 17C, 17D and 17E inside the laminating head 2 of the prepreg lamination apparatus 1A. FIG. 10 is a side view of the power rollers 17A, 17B, 17C, 17D and 17E shown in FIG. 9. FIG. 11 is a perspective view showing an example of the power rollers 17A, 17B, 17C, 17D and 17E shown in FIG. 9 whose intervals have been narrowed.

When the first prepreg tape P1, the second prepreg tape P2, the third prepreg tape P3, the fourth prepreg tape P4 and the fifth prepreg tape P5 are fed by the first power roller 17A, the second power roller 17B, the third power roller 17C, the fourth power roller 17D and the fifth power roller 17E respectively, and subsequently pressed by the common compaction roller 15, similarly to the first implementation, the first power roller 17A, the second power roller 17B, the third power roller 17C, the fourth power roller 17D and the fifth power roller 17E can be disposed as exemplified by FIG. 9 to FIG. 11.

More specifically, the third power roller 17C for feeding the central third prepreg tape P3 can be fixed not so as to move in the rotating axis direction. Meanwhile, the second power roller 17B and the fourth power roller 17D for respectively feeding the second prepreg tape P2 and the fourth prepreg tape P4, adjacent on both sides to the central third prepreg tape P3, can be disposed on positions each shifted in the radial direction from the central third power roller 17C so that the respective rotating axes of the second power roller 17B and the fourth power roller 17D may be on the same straight line and may not be on the same straight line as the rotating axis of the central third power roller 17C. Thereby, the central third prepreg tape P3 can be overlapped with each of the second prepreg tape P2 and the fourth prepreg tape P4 adjacent on both sides, by a predetermined overlap width.

Similarly, the first power roller 17A and the fifth power roller 17E for feeding the first prepreg tape P1 and the fifth prepreg tape P5 respectively can be disposed on positions each shifted in the radial direction from the second power roller 17B and the fourth power roller 17D so that the first prepreg tape P1 and the fifth prepreg tape P5 adjacent on outer sides than the second prepreg tape P2 and the fourth prepreg tape P4 can be overlapped with the second prepreg tape P2 and the fourth prepreg tape P4 respectively by a predetermined overlap width. That is, the first power roller 17A and the fifth power roller 17E can be disposed so that the rotating axes of the first power roller 17A and the fifth power roller 17E may be on the same straight line and may not be on the same straight line as the rotating axes of the second power roller 17B and the fourth power roller 17D.

Although the rotating axes of the first power roller 17A and the fifth power roller 17E are on the same straight line as the rotating axis of the third power roller 17C, in the example shown in FIG. 9 and FIG. 10, from a viewpoint of suppressing increase in size and simplifying structure of the laminating head 2, the first power roller 17A and the fifth power roller 17E may be displaced relatively to the third power roller 17C so that the rotating axes of the first power roller 17A and the fifth power roller 17E may be on a straight line different from and parallel to a straight line on which the rotating axis of the third power roller 17C lies.

When the first power roller 17A, the second power roller 17B, the third power roller 17C, the fourth power roller 17D and the fifth power roller 17E are disposed so that the number of coaxially disposed rollers, except for the third power roller 17C which does not move in the rotating axis direction, may be not more than two, and the rotating axes of adjacent rollers may not be on the same straight line, as shown in FIG. 9 and FIG. 10, the intervals between the first power roller 17A, the second power roller 17B, the third power roller 17C, the fourth power roller 17D and the fifth power roller 17E can be changed in the rotating axis direction as exemplified by FIG. 11.

Figure 12:
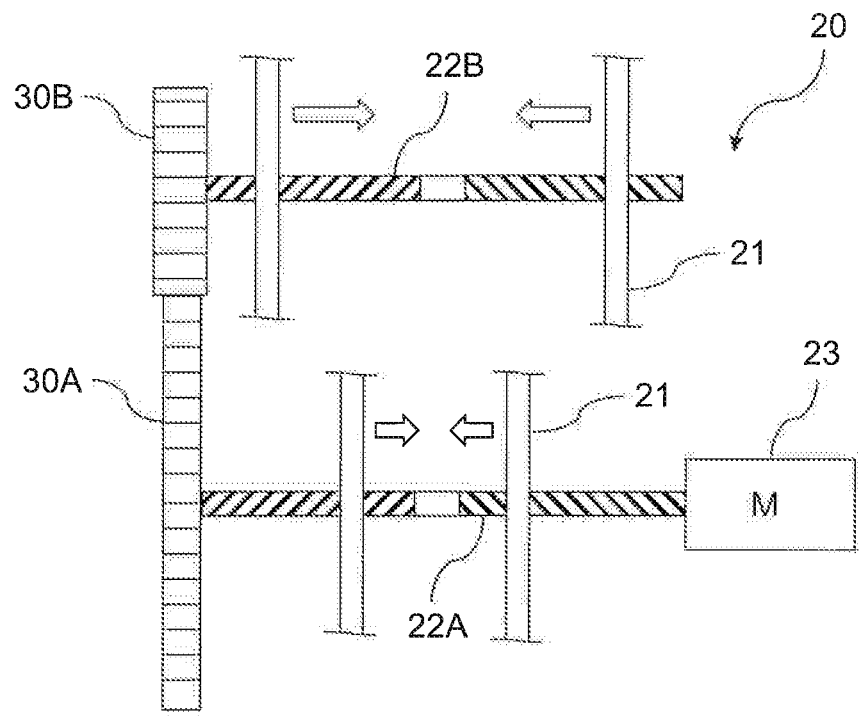
FIG. 12 shows an example of structure of the overlap width adjustment device for changing the intervals between the power rollers shown in FIG. 9.

FIG. 12 shows an example of structure of the overlap width adjustment device 20 for changing the intervals between the power rollers 17A, 17B, 17C, 17D and 17E shown in FIG. 9.

The first power roller 17A, the second power roller 17B, the fourth power roller 17D and the fifth power roller 17E, which should be moved in the rotating axis direction, can be coupled to the frames 21 respectively, similarly to the example shown in FIG. 7 and FIG. 8. The two frames 21, coupled to the inner second power roller 17B and fourth power roller 17D whose interval is to be adjusted, can have a right female screw and a left female screw respectively, and coupled to each other by the first ball screw 22A on which a right male screw and a left male screw have been formed. Similarly, the two frames 21, coupled to the outer first power roller 17A and fifth power roller 17E whose interval is to be adjusted, can have a female right screw and a left female screw respectively, and coupled to each other by the second ball screw 22B on which a right male screw and a left male screw have been formed.

Thereby, the interval between the second power roller 17B and the fourth power roller 17D can be adjusted by adjusting the rotation amount of the first ball screw 22A. Similarly, the interval between the first power roller 17A and the fifth power roller 17E can be adjusted by adjusting the rotation amount of the second ball screw 22B. The first ball screw 22A and the second ball screw 22B may be rotated by the dedicated motors 23 respectively, or may be rotated by the common motor 23 by transmitting torque through a pair of gears 30A and 30B as exemplified by FIG. 12.

In order to uniform the overlap widths between the adjacent prepreg tapes P1, P2, P3, P4 and P5, it is necessary to uniform the overlap widths, in the rotating axis direction, between the adjacent power rollers 17A, 17B, 17C, 17D and 17E. More specifically, in order to make the overlap width between the first prepreg tape P1 and the second prepreg tape P2, the overlap width between the second prepreg tape P2 and the third prepreg tape P3, the overlap width between the third prepreg tape P3 and the fourth prepreg tape P4, and the overlap width between the fourth prepreg tape P4 and the fifth prepreg tape P5 identical to each other, it is necessary to equalize the overlap width, in the rotating axis direction, between the first power roller 17A and the second power roller 17B, the overlap width, in the rotating axis direction, between the second power roller 17B and the third power roller 17C, the overlap width, in the rotating axis direction, between the third power roller 17C and the fourth power roller 17D, and the overlap width, in the rotating axis direction, between the fourth power roller 17D and the fifth power roller 17E.

When the number of the power rollers 17 is three as exemplified in FIG. 7 and FIG. 8, the overlap widths, in the rotating axis direction, between the three power rollers 17 can be made identical to each other by disposing the unmoving power roller 17 in the middle of the two power rollers 17 whose interval is changed, and moving the two power rollers 17 whose interval is changed, in the rotating axis directions opposite to each other.

On the other hand, when the inner second power roller 17B and fourth power roller 17D respectively adjacent to the outer first power roller 17A and fifth power roller 17E are moved in the rotating axis direction as exemplified by FIG. 9, equalizing the moving speeds, in the rotating axis direction, of the outer first power roller 17A and fifth power roller 17E with those of the inner second power roller 17B and fourth power roller 17D respectively results in stillness and motionlessness of the outer first power roller 17A and fifth power roller 17E relative to the inner second power roller 17B and fourth power roller 17D respectively.

In other words, in order to make the absolute value of each of the relative speeds of the second power roller 17B and the fourth power roller 17D in the rotating axis direction to the central third power roller 17C, the absolute value of the relative speed of the first power roller 17A in the rotating axis direction to the second power roller 17B, and the absolute value of the relative speed of the fifth power roller 17E in the rotating axis direction to the fourth power roller 17D identical to each other, it is necessary to make the absolute value of each of the relative speeds of the first power roller 17A and the fifth power roller 17E in the rotating axis direction to the central third power roller 17C twice as much as that of each of the relative speeds of the second power roller 17B and the fourth power roller 17D in the rotating axis direction to the central third power roller 17C. That is, it is necessary to make each of the moving distances of the first power roller 17A and the fifth power roller 17E in the rotating axis direction twice as much as each of the moving distances of the second power roller 17B and the fourth power roller 17D in the rotating axis direction.

For that purpose, what is necessary is to make the rotation speed and the rotation amount of the second ball screw 22B twice as much as the rotation speed and the rotation amount of the first ball screw 22A respectively. Therefore, when the first ball screw 22A and the second ball screw 22B are rotated by the common motor 23 through the gear 30A and the gear 30B, as exemplified by FIG. 12, it is appropriate to set the gear ratio of the gear 30A to the gear 30B to 2:1.

Therefore, when the overlap widths between the power rollers 17 are adjusted by the single ball screw 22 or the ball screws 22 each having a right screw and a left screw, stopping the central power roller 17 while moving the other power rollers 17 in parallel by the ball screw 22 or the ball screws 22 whose rotation speeds are different from each other and depend on the distances from the central power roller 17 respectively, as exemplified by FIG. 7 and FIG. 9, leads to the simplification of structure of the overlap width adjustment device 20.

As another method, the overlap width adjustment device 20 may be composed of the ball screw 22 having two screws whose leads are different from each other. Note that, a lead means the distance between two threads of a screw. In this case, determining the ratio between the leads to 1:2 allows parallel shift of the two power rollers 17 in the rotating axis direction with the moving speed ratio of 1:2 even when the rotation speed of the ball screw 22 is constant. Therefore, when each of the right screw and the left screw is formed as a male screw having different leads whose lead ratio is 1:2, the four power rollers 17 can be moved in parallel in the rotating axis direction at appropriate speeds respectively by the single ball screw 22 having the right screw and the left screw.

Note that, although a case where the frames 21 coupled to the power rollers 17 respectively are moved by the ball screw 22 or the ball screws 22 has been described in the above-mentioned examples, other rollers coupled to the power rollers 17 through the frames 21 respectively or the power rollers 17 themselves may be rotated by cylindrical rotation shaft or cylindrical rotation shafts so that the ball screw 22 or the ball screws 22 can be disposed in the hollow rotation shaft or the hollow rotation shafts, and thereby the other rollers coupled to the power rollers 17 through the frames 21 respectively can be moved in the rotating axis direction, or the power rollers 17 themselves can be directly moved in the rotating axis direction.

When the power rollers 17 disposed as exemplified by FIG. 7 and FIG. 9 are slid relatively in the rotating axis direction, the prepreg tapes P can be laminated on the lamination jig T or the table 4 in a state where the prepreg tapes P are overlapped with each other. When the prepreg tapes P are overlapped with each other, unevenness arises on each overlapped portion. Nevertheless, the unevenness becomes an extent of a level difference whose thickness does not influence mechanical strength required for a composite material since the originally thin prepreg tapes P are compressed by the compaction roller 15 or the compaction rollers 15.

Therefore, preforms of which widths are different from each other can be produced with the common power rollers 17 and the prepreg tapes P each having a constant width. In particular, a preform of which width changes can be also produced by advancing the laminating head 2 while sliding the power rollers 17 relatively to each other in the rotating axis direction.

Figure 13:
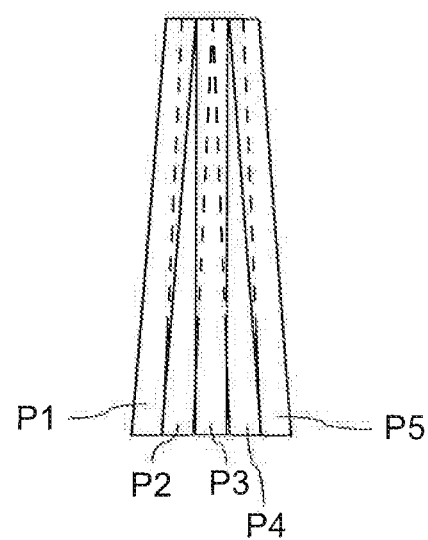
FIG. 13 is a top view showing an example of a laminated body of the prepreg tapes P1, P2, P3, P4 and P5 which can be laminated by the laminating head 2 including the five power rollers 17A, 17B, 17C, 17D and 17E shown in FIG. 9.

FIG. 13 is a top view showing an example of a laminated body of the prepreg tapes P1, P2, P3, P4 and P5 which can be laminated by the laminating head 2 including the five power rollers 17A, 17B, 17C, 17D and 17E shown in FIG. 9.

For example, when the laminating head 2 is moved linearly in a direction opposite to a feeding direction of the prepreg tapes P1, P2, P3, P4 and P5 while changing the overlap widths between the prepreg tapes P1, P2, P3, P4 and P5 by moving the five power rollers 17A, 17B, 17C, 17D and 17E in parallel in the rotating axis direction, the prepreg tapes P1, P2, P3, P4 and P5 can be spread so that the width may narrow gradually as exemplified by FIG. 13 or conversely widen gradually.

Moreover, when the laminating head 2 is not only moved linearly but also rotated simultaneously, the prepreg tapes P1, P2, P3, P4 and P5 can be also spread so as to have a curved shape whose width changes. Accordingly, a preform and a composite material having a complicated shape can be produced.

The maximum width of the prepregs P which can be laminated in one movement of the laminating head 2 is equivalent to the width of the prepreg tapes P spread with no overlap widths and no clearance gaps, i.e., the sum of the widths of the prepreg tapes P. Conversely, the minimum width of the prepregs P which can be laminated in one movement of the laminating head 2 is equivalent to the width of the prepreg tapes P spread with the maximum overlap widths. The width of the prepreg tapes P spread with the maximum overlap widths varies depending on the number and arrangement of the power rollers 17.

Since the power rollers 17 whose rotating axes are on the same straight line cannot be overlapped with each other in the rotating axis direction as exemplified by FIG. 7 or FIG. 9, the prepreg tapes P fed out from the power rollers 17 whose rotating axes are on the same straight line cannot be also overlapped with each other.

As a concrete example, the minimum width of the three prepreg tapes P1, P2 and P3 laminated by feeding out the prepreg tapes P1, P2 and P3 as shown in FIG. 7 with minimizing the interval between the two power rollers 17 on both sides whose rotating axes are disposed on the same straight line, out of the three power rollers 17, becomes the sum of the widths of the two prepreg tapes P1 and P3 on both sides since the central prepreg tape P2 forms the lower ply than the ply formed by the two prepreg tapes P1 and P3 on both sides. On the other hand, the minimum width of the five prepreg tapes P1, P2, P3, P4 and P5, as shown in FIG. 9, laminated with minimizing the intervals between the power rollers 17A, 17B, 17C, 17D and 17E becomes the sum of the widths of the first prepreg tape P1, the third prepreg tape P3 and the fifth prepreg tape P5 since the second prepreg tape P2 and the fourth prepreg tape P4 form the lower ply.

In contrast, when not less than three power rollers 17 are disposed so that any two of the rotating axes of them may not be on the same straight line, even the prepreg tapes P which are not adjacent to each other can be overlapped with each other. As a concrete example, all the power rollers 17 may be disposed so that any two of the rotating axes may not be on the same straight line. In this case, all the prepreg tapes P can be overlapped with each other. Therefore, the width of the prepreg tapes P with the maximum overlap widths is equivalent to the width of the single prepreg tape P.

That is, when the number of the power rollers 17 of which any two of the rotating axes are not on the same straight line is increased, the variable range of the width of the laminated prepregs P can be widened. Therefore, when the flexibility in width of the laminated prepregs P is significant, all the power rollers 17 may be shifted radially to be disposed. Conversely, avoiding the increase in size of the laminating head 2 is significant, it is reasonable to dispose the power rollers 17 so that some of the rotating axes may be on the same straight line as exemplified by FIG. 7 and FIG. 9.

In the above-described second implementation, tape materials of the prepregs P are disposed with adjusting each overlap width, and subsequently the laminated prepreg tapes P are smoothed by the compaction roller 15 or the compaction rollers 15. Therefore, according to the second implementation, an effect that composite materials having widths different from each other and a composite material of which width changes can be easily molded can be attained in addition to the effects similar to those in the first implementation.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, although the relative movement among the power rollers 17 is restricted to parallel translation in each implementation mentioned above, a relative rotational movement may be performed. As a concrete example, when the prepreg tapes P are laminated with changing at least one overlap width, any two of the length directions of the prepreg tapes P are not parallel to each other. For that reason, the direction of at least one power roller 17 may be changed in the length direction of any of the prepreg tapes P.

Moreover, the prepreg tapes P may be fed out with a clearance between any two of the prepreg tapes P. As a concrete example, when the prepreg tapes P are laminated by reciprocating the laminating head 2, a possibly generated clearance between any two of the prepreg tapes P in a forward traveling of the laminating head 2 can be filled by a backward traveling of the laminating head 2.

As described above, the prepreg tapes P can be fed out in the feeding direction by moving the laminating head 2 including the power rollers 17 relatively to the table 4 while moving the power rollers 17 relatively to each other, and/or rotationally moving at least one of the power rollers 17, relatively to the table 4, around an axis which is not parallel to the rotating axis of the at least one of the power rollers 17.

What is claimed is:

1. A prepreg lamination apparatus comprising:
   at least one first roller for sending out a first prepreg tape which is a part of material of a fiber reinforced plastic;
   at least one second roller for sending out a second prepreg tape which is another part of the material of the fiber reinforced plastic;
   a table for laminating the first prepreg tape and the second prepreg tape directly or indirectly; and
   a feeder adapted to feed out the first prepreg tape and the second prepreg tape in a feeding direction by moving the at least one first roller and the at least one second roller relatively to the table while performing rotation of one or both of the at least one first roller and the at least one second roller relatively to the table around an axis which is not parallel to each of a first rotation axis of the at least one first roller and a second rotation axis of the at least one second roller, and wherein moving the at least one first roller and the at least one second roller relatively to the table includes adjusting relative spacing between the at least one first roller supporting the first prepreg tape and the at least one second roller supporting the second prepreg tape, in a direction parallel to each of the first rotation axis and the second rotation axis, while the first and second prepreg tapes are being compressed relative to the table, as to adjust an overlap width of at least one of the first and second prepreg tapes relative to an adjacent prepreg tape being compressed against the table.

2. The prepreg lamination apparatus according to claim 1, wherein the first rotation axis of the at least one first roller is parallel to the second rotation axis of the at least one second roller, the feeder changes the feeding direction by rotating both the at least one first roller and the at least one second roller relatively to the table, and the axis around which the at least one first roller and the at least one second roller are rotated relatively to the table is perpendicular to each of the feeding direction, the first rotation axis and the second rotation axis.

3. The prepreg lamination apparatus according to claim 1, wherein the first rotation axis of the at least one first roller and the second rotation axis of the at least one second roller are each parallel to a surface of the table, the feeder changes the feeding direction by rotating both the at least one first roller and the at least one second roller relatively to the table, and the axis around which the at least one first roller and the at least one second roller are rotated relatively to the table is perpendicular to the surface of the table.

4. The prepreg lamination apparatus according to claim 1, wherein the first rotation axis of the at least one first roller is coincident with the second rotation axis of the at least one second roller, and the feeder moves the at least one first roller relatively to the at least one second roller along an axis coinciding with the first rotation axis and the second rotation axis.

5. The prepreg lamination apparatus according to claim 1, wherein the first rotation axis of the at least one first roller and the second rotation axis of the at least one second roller are not on a same straight line, and the feeder adjusts at least one overlap width, in a direction parallel to each of the first rotation axis and the second rotation axis, between the at least one first roller and the at least one second roller.

6. The prepreg lamination apparatus according to claim 5, wherein the at least one first roller and the at least one second roller are disposed alternately in the direction parallel to the each of the first rotation axis and the second rotation axis, each first roller of the at least one first roller being adjacent to a corresponding second roller of the at least one second roller, and the at least one overlap width adjusted by the feeder includes a width between the each first roller and the adjacent corresponding second roller.

7. A prepreg lamination apparatus comprising:
at least one first roller for sending out a first prepreg tape which is a part of material of a fiber reinforced plastic;
at least one second roller for sending out a second prepreg tape which is another part of the material of the fiber reinforced plastic;
a table for laminating the first prepreg tape and the second prepreg tape directly or indirectly; and
a feeder adapted to feed out the first prepreg tape and the second prepreg tape in a feeding direction by moving the at least one first roller and the at least one second roller relatively to the table while performing one or both of movement of the at least one first roller relatively to the at least one second roller, and rotation of one or both of the at least one first roller and the at least one second roller relatively to the table around an axis which is not parallel to each of a first rotation axis of the at least one first roller and a second rotation axis of the at least one second roller, wherein the first rotation axis of the at least one first roller and the second rotation axis of the at least one second roller are not on a same straight line, and the feeder adjusts at least one overlap width, in a direction parallel to each of the first rotation axis and the second rotation axis, between the at least one first roller and the at least one second roller, wherein the at least one first roller and the at least one second roller are disposed alternately in the direction parallel to the each of the first rotation axis and the second rotation axis, each first roller of the at least one first roller being adjacent to a corresponding second roller of the at least one second roller, and the at least one overlap width adjusted by the feeder includes a width between the each first roller and the adjacent corresponding second roller, and wherein the at least one second roller includes second rollers, and the feeder includes a ball screw coupling the second rollers to each other, and adjusts at least one interval between the second rollers in a direction of rotation axes of the second rollers, by rotating the ball screw.

8. A prepreg lamination apparatus comprising:
at least one first roller for sending out a first prepreg tape which is a part of material of a fiber reinforced plastic;
at least one second roller for sending out a second prepreg tape which is another part of the material of the fiber reinforced plastic;
a table for laminating the first prepreg tape and the second prepreg tape directly or indirectly; and
a feeder adapted to feed out the first prepreg tape and the second prepreg tape in a feeding direction by moving the at least one first roller and the at least one second roller relatively to the table while performing one or both of movement of the at least one first roller relatively to the at least one second roller, and rotation of one or both of the at least one first roller and the at least one second roller relatively to the table around an axis which is not parallel to each of a first rotation axis of the at least one first roller and a second rotation axis of the at least one second roller, and
a pressing member, having at least one of a plate, a block and a roller for compressively stressing the first prepreg tape and the second prepreg tape fed out from the at least one first roller and the at least one second roller respectively, the first prepreg tape and the second prepreg tape being compressively stressed in thickness directions respectively.

9. A method of laminating prepregs comprising:
producing a laminated body of the prepregs consisting of first prepregs including the first prepreg tape and second prepregs including the second prepreg tape, using the prepreg lamination apparatus according to claim 1.

10. A method of laminating prepregs with the prepreg lamination apparatus according to claim 1, comprising:
sending out the first prepreg tape by the first roller, the first prepreg tape being a part of material of a fiber reinforced plastic;
sending out the second prepreg tape by the second roller, the second prepreg tape being another part of the material of the fiber reinforced plastic; and
directly or indirectly laminating the first prepreg tape and the second prepreg tape on the table,
wherein the first prepreg tape and the second prepreg tape are sent out in a feeding direction by moving the first roller and the second roller relatively to the table while performing movement of the first roller relatively to the second roller, and rotation of at least one of the first roller and the second roller relatively to the table around an axis which is not parallel to each of a first rotation axis of the first roller and a second rotation axis of the second roller.

11. The method according to claim 9, wherein widths of the first prepreg tape and the second prepreg tape are determined depending on at least one of a maximum curvature of a curved portion of the fiber reinforced plastic to be formed and a minimum width of a plate-like portion of the fiber reinforced plastic to be formed.

12. The method according to claim 9, wherein widths of the first prepreg tape and the second prepreg tape are determined depending on a radius of the rotation of the at least one of the first roller and the second roller so that when the first prepreg tape and the second prepreg tape are laminated on the table by feeding out the first prepreg tape and the second prepreg tape while performing the rotation, a difference or ratio between lengths of a tape on a side close to the axis of the rotation and another tape on a side distant from the axis of the rotation, out of the laminated first and second prepreg tapes, may become not more than a predetermined length or value.

13. A method of molding a composite material comprising:
forming the fiber reinforced plastic by curing a laminated body of first prepregs including the first prepreg tape and second prepregs including the second prepreg tape, the laminated body having been produced using the prepreg lamination apparatus according to claim 1.

14. A method of molding a composite material comprising:
forming the fiber reinforced plastic by curing a laminated body of the prepregs consisting of first prepregs including the first prepreg tape and second prepregs including the second prepreg tape, the laminated body having been produced by the method according to claim 9.

15. The prepreg lamination apparatus according to claim 2,
wherein the first rotation axis of the at least one first roller and the second rotation axis of the at least one second roller are not on a same straight line, and
the feeder adjusts at least one overlap width, in a direction parallel to each of the first rotation axis and the second rotation axis, between the at least one first roller and the at least one second roller.

16. The prepreg lamination apparatus according to claim 3,
wherein the first rotation axis of the at least one first roller and the second rotation axis of the at least one second roller are not on a same straight line, and
the feeder adjusts at least one overlap width, in a direction parallel to each of the first rotation axis and the second rotation axis, between the at least one first roller and the at least one second roller.

17. The prepreg lamination apparatus according to claim 4,
wherein
the feeder adjusts at least one overlap width, in a direction parallel to each of the first rotation axis and the second rotation axis, by moving each of the at least one first roller and the at least one second roller closer to one another along the coinciding axis.

18. The method according to claim 10,
wherein widths of the first prepreg tape and the second prepreg tape are determined depending on at least one of a maximum curvature of a curved portion of the fiber reinforced plastic to be formed and a minimum width of a plate-like portion of the fiber reinforced plastic to be formed.

19. The method according to claim 10,
wherein widths of the first prepreg tape and the second prepreg tape are determined depending on a radius of the rotation of the at least one of the first roller and the second roller so that when the first prepreg tape and the second prepreg tape are laminated on the table by feeding out the first prepreg tape and the second prepreg tape while performing the rotation, a difference or ratio between lengths of a tape on a side close to the axis of the rotation and another tape on a side distant from the axis of the rotation, out of the laminated first and second prepreg tapes, may become not more than a predetermined length or value.

20. A method of molding a composite material comprising:
forming the fiber reinforced plastic by curing a laminated body of the prepregs consisting of first prepregs including the first prepreg tape and second prepregs including the second prepreg tape, the laminated body having been produced by the method according to claim 10.

21. The prepreg lamination apparatus according to claim 1,
wherein the at least one second roller includes a plurality of second rollers, and
the feeder includes a ball screw coupling the second rollers to each other, and adjusts at least one interval between the second rollers in a direction of rotation axes of the second rollers, by rotating the ball screw.

22. The prepreg lamination apparatus according to claim 1, further including:
a pressing member, having at least one of a plate, a block and a roller for compressively stressing the first prepreg tape and the second prepreg tape fed out from the at least one first roller and the at least one second roller respectively, the first prepreg tape and the second prepreg tape being compressively stressed in thickness directions respectively.

23. The prepreg lamination apparatus according to claim 1,
wherein the first rotation axis of the at least one first roller and the second rotation axis of the at least one second roller are not on a same straight line,
wherein the first rotation axis supports a first set of rollers including the first roller, wherein each roller in the first set feeds a corresponding prepreg tape,
wherein the second rotation axis supports a second set of rollers including the second roller, wherein each roller in the second set feeds a corresponding prepreg tape, and
wherein the feeder adjusts at least a pair of rollers in the first set as well as a pair of rollers in the second set as to adjust a plurality of prepreg tape overlap widths in a direction parallel to each of the first rotation axis and the second rotation axis.

* * * * *